(12) United States Patent
Phadke et al.

(10) Patent No.: US 8,842,451 B2
(45) Date of Patent: Sep. 23, 2014

(54) POWER SYSTEMS FOR PHOTOVOLTAIC AND DC INPUT SOURCES

(75) Inventors: Vijay G. Phadke, Pasig (PH); James Sigamani, Pasig (PH)

(73) Assignee: Astec International Limited, Kwun Tong, Kowloon (HK)

( * ) Notice: Subject to any disclaimer, the term of this patent is extended or adjusted under 35 U.S.C. 154(b) by 470 days.

(21) Appl. No.: 13/040,981

(22) Filed: Mar. 4, 2011

(65) Prior Publication Data

US 2012/0127764 A1 May 24, 2012

Related U.S. Application Data

(60) Provisional application No. 61/416,659, filed on Nov. 23, 2010.

(51) Int. Cl.
| | | |
|---|---|---|
| H02M 5/45 | (2006.01) | |
| H02J 3/38 | (2006.01) | |
| H02M 7/48 | (2006.01) | |
| H02M 3/158 | (2006.01) | |

(52) U.S. Cl.
CPC .............. *H02J 3/383* (2013.01); *H02M 3/1582* (2013.01); *Y02E 10/563* (2013.01); *Y02E 10/58* (2013.01); *H02M 7/4807* (2013.01)
USPC .......................................................... 363/37

(58) Field of Classification Search
USPC .............................. 363/34, 35, 37, 40, 41, 44
See application file for complete search history.

(56) References Cited

U.S. PATENT DOCUMENTS

| | | | |
|---|---|---|---|
| 6,348,781 B1 | 2/2002 | Midya et al. | |
| 7,432,689 B2 | 10/2008 | Miller et al. | |
| 7,450,401 B2 * | 11/2008 | Iida ................................. | 363/16 |
| 7,900,361 B2 | 3/2011 | Adest et al. | |
| 2008/0055941 A1 | 3/2008 | Victor et al. | |
| 2008/0136367 A1 | 6/2008 | Adest et al. | |
| 2008/0143188 A1 | 6/2008 | Adest et al. | |
| 2008/0144294 A1 | 6/2008 | Adest et al. | |
| 2008/0147335 A1 | 6/2008 | Adest et al. | |
| 2008/0150366 A1 | 6/2008 | Adest et al. | |
| 2008/0266922 A1 * | 10/2008 | Mumtaz et al. ............... | 363/131 |
| 2009/0039852 A1 | 2/2009 | Fishelov et al. | |
| 2010/0207455 A1 | 8/2010 | Erickson, Jr. et al. | |
| 2010/0236612 A1 * | 9/2010 | Khajehoddin et al. ........ | 136/252 |
| 2012/0042588 A1 * | 2/2012 | Erickson, Jr. ................. | 52/173.3 |

OTHER PUBLICATIONS

"Low Cost DC to AC Converter for Photovoltaic Power Conversion in Residential Applications", U. Herrmann, H.G. Langer; 1993; pp. 588-594.

* cited by examiner

*Primary Examiner* — Nguyen Tran
(74) *Attorney, Agent, or Firm* — Harness, Dickey & Pierce, P.L.C.

(57) ABSTRACT

A power conversion system for use with a photovoltaic (PV) power source may include a DC/DC converter for converting a first DC voltage into a second DC voltage, an isolation transformer, an inverter for converting DC power to AC power, and at least one controller for controlling the DC/DC converter and the inverter. The controller may be configured to operate the DC/DC converter as a buck converter or a boost converter based, at least in part, on whether the first DC voltage is less or greater than a reference voltage. Additionally, the controller may operate the converter according to a maximum power point tracking algorithm. Further, the controller may be configured to operate the inverter to control the DC voltage at the inverter's input as a function of the AC voltage at the inverter's output. Example embodiments of power systems, DC/DC converters, DC/AC inverters and related methods are also disclosed.

23 Claims, 5 Drawing Sheets

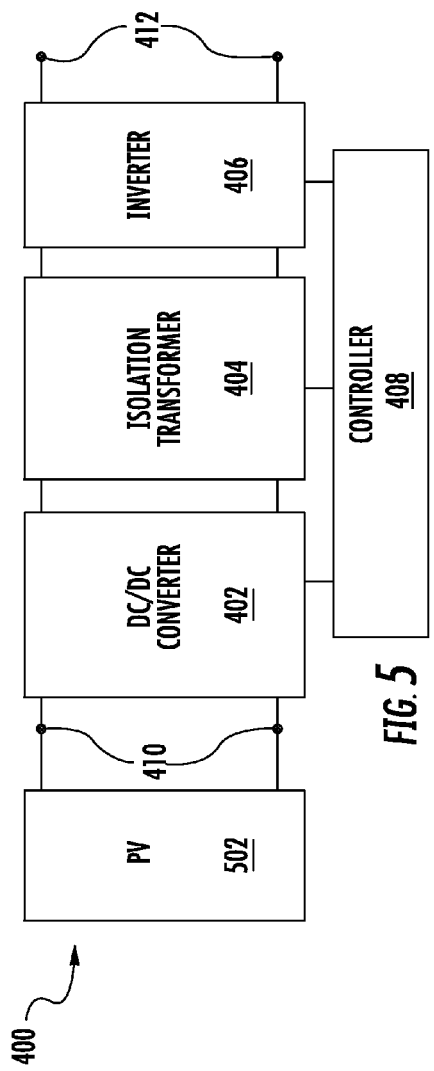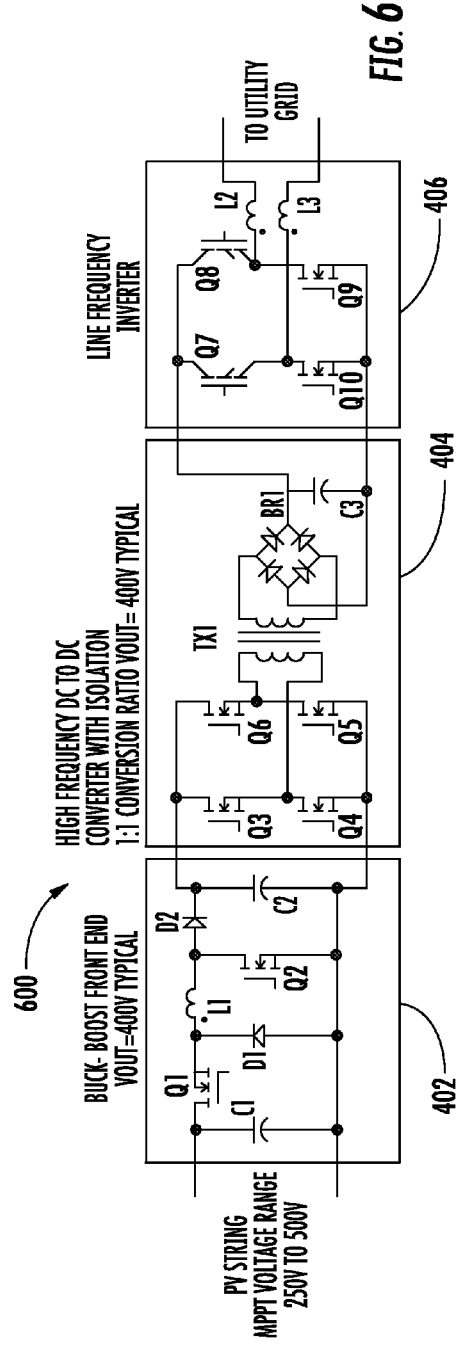

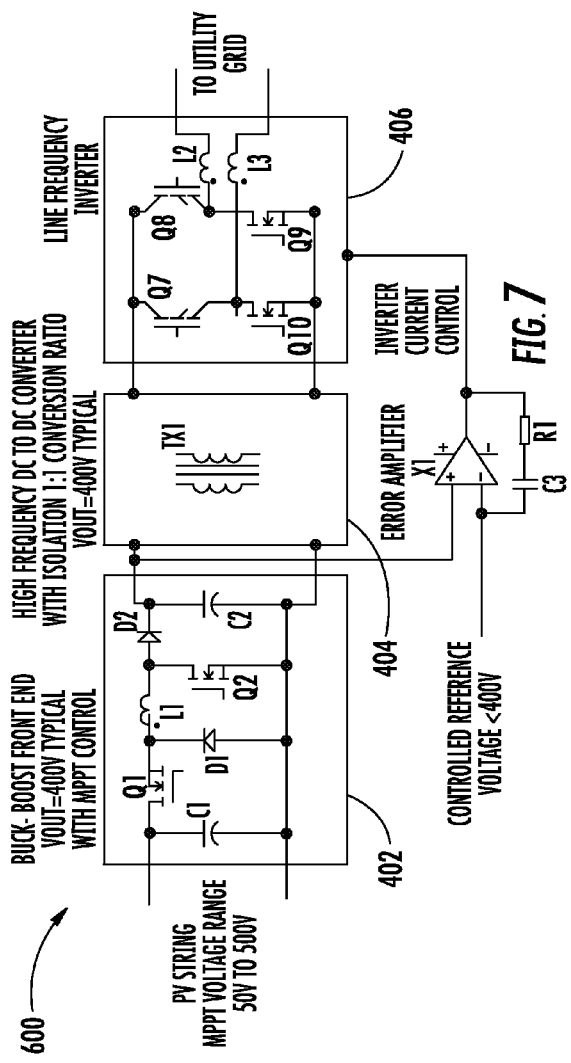
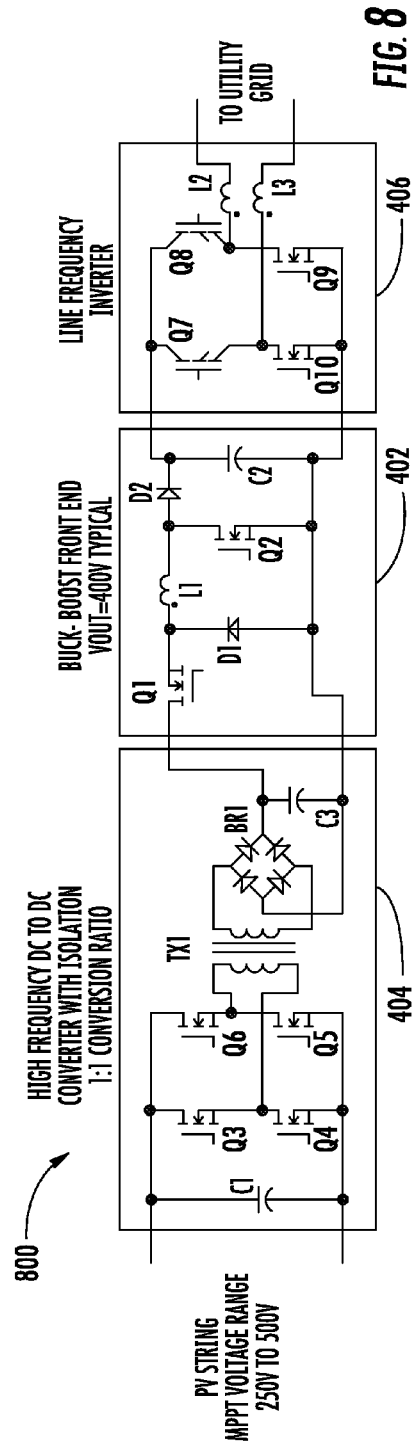

POWER SYSTEMS FOR PHOTOVOLTAIC AND DC INPUT SOURCES

CROSS-REFERENCE TO RELATED APPLICATION

This application claims the benefit of U.S. Provisional Application No. 61/416,659, filed Nov. 23, 2010. The entire disclosure of the above application is incorporated herein by reference.

FIELD

The present disclosure relates to power systems for photovoltaic and DC input sources.

BACKGROUND

This section provides background information related to the present disclosure which is not necessarily prior art.

Photovoltaic (PV) devices convert sunlight to electricity. A PV device may consist of a single panel, multiple panels, rigid panels, flexible panels, serial panels, parallel panels, etc. The output of a PV device is typically unregulated (i.e. the output varies with changes in sunlight intensity, temperature, etc.). Further, the output of one PV device may differ from the output of another PV device due to manufacturing variations, different operating temperatures, unequal ageing, different positioning and/or mounting angles, different shading from trees, structures or clouds, different amounts of dirt or debris on the respective PV devices, etc.

In the United States of America, safety requirements for grid tied photovoltaic (PV) inverter systems typically limit open circuit PV string voltage to 600 VDC and require the PV panels to be galvanically isolated from the grid. PV systems generally maximize the PV string voltage to keep the operating current level as low as possible. In typical installations, PV string voltage is often limited to 550V to maintain an adequate de-rating margin. Thus, on many energy production days, the open circuit PV string voltage in a typical installation is to be close to 550V.

For most of the available PV panels or modules, the maximum power point (MPP) voltage is in the range of 75% to 85% of the open circuit voltage. Thus, the operating MPP voltage will commonly be in the range of 420V to 460V. The MPP voltage decreases as the operating temperature increases. While delivering relatively high power levels, the temperature of a PV panel increases and the operating MPP voltage falls much lower, commonly to about 350V. In some cases of very high temperature and/or partial shading on the PV panels, the MPP voltage can be as low as 250V. This is common in summer in hot climates. Thus, many commercial grid tied inverters are designed to operate over an MPP voltage range of 250V to 500V.

However, the nominal grid voltage to which a grid tied PV system is tied is often 230V+/−15%. Many inverters employ a buck converter topology and need an input voltage higher than the peak of the grid voltage. Thus, the DC to AC inverter block of a grid tied system typically needs a DC bus of about 400V as a voltage input. As mentioned above, however, the MPP voltage often varies from 250V to 550V and needs to be converted to a bus voltage of approximately 400V.

FIG. 1 shows one prior art grid tied PV inverter system. As shown, the PV string voltage is boosted to a level which is slightly above the maximum expected MPP voltage, 500V in this case. The 500V is then converted into a sinusoidal AC current at the grid frequency and fed into the grid. Because US applications typically require galvanic isolation, an isolation transformer that operates at utility line frequency is used for isolation.

The topology shown in FIG. 1 is often relatively large in size and weight. Further it may be lower in efficiency than some other topologies. A boost converter generally operates at higher efficiency when running on a smaller duty cycle. As the MPP voltage will be mostly in 350V to 400V range, the boost ratio for the system in FIG. 1, and accordingly the duty cycle, is relatively high and the operating efficiency may be relatively low. The inverter efficiency may be degraded by operation at a higher input voltage than needed.

In the prior art grid tied PV inverter system in FIG. 2, the PV string voltage is boosted to a level of about 500V. This DC bus is stepped down to a level of about 400VDC with isolation using a high frequency switching converter and fed in to a grid tied DC to AC inverter. This eliminates the low frequency isolation transformer. The system in FIG. 2 retains a relatively large boost ratio, and duty cycle, in the common operating MPP voltage range of 350V to 450V.

FIG. 3 shows another prior art grid tied PV inverter system in which PV string voltage is reduced with a buck converter to a level slightly below the lowest rated MPP voltage. The PV string voltage is stepped down to about 240V DC. The 240V is then stepped up to 400V DC using a high frequency isolation switching converter stage. This 400V DC bus is fed to the DC to AC grid tied inverter stage. Unlike a boost converter, buck converters operate at higher efficiency with larger duty cycles. The efficiency of the system in FIG. 3 is somewhat limited by the relatively small duty cycles needed to step down the common 350V to 450V MPP voltage to 240V. The isolation stage of the system in FIG. 3 may be complicated by the need to step up the voltage in the isolation stage.

SUMMARY

This section provides a general summary of the disclosure, and is not a comprehensive disclosure of its full scope or all of its features.

According to one aspect of the present disclosure, a power conversion system for use with a photovoltaic (PV) power source includes a DC/DC converter for converting a first DC voltage into a second DC voltage, an isolation transformer, an inverter for converting DC power to AC power, and at least one controller for controlling the DC/DC converter and the inverter. The controller is configured to operate the DC/DC converter as a buck converter or a boost converter based, at least in part, on whether the first DC voltage is less or greater than a reference voltage.

According to another aspect of the present disclosure, a power system includes an input for receiving an input voltage from a variable DC input source, an output for providing an output voltage, a buck-boost converter, and at least one controller configured to operate the buck-boost converter as a buck converter or a boost converter based, at least in part, on whether the input voltage is greater or less than a reference voltage, and to operate the converter according to a maximum power point tracking algorithm.

According to still another aspect of the present disclosure, a power system includes an input for receiving an input voltage from a variable DC input source, an output for providing an output voltage, an inverter including an input for receiving a DC voltage and an output for providing an AC voltage, and at least one controller configured to operate the inverter to control the DC voltage at the inverter's input as a function of the AC voltage at the inverter's output.

Some example embodiments of power systems, DC/DC converters, DC/AC inverters and related methods incorporating one of more of these aspects are described below. Additional aspects and areas of applicability will become apparent from the description below. It should be understood that various aspects of this disclosure may be implemented individually or in combination with one or more other aspects. It should also be understood that the description and specific examples herein are provided for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a block diagram of the power system of FIG. 4 used with photovoltaic input power sources.

FIG. 6 illustrates an example construction of the power system of FIG. 4.

FIG. 7 is a circuit diagram of the power system of FIG. 6 with an error amplifier for controlling an inverter based in part on the AC grid voltage.

FIG. 8 is a simplified circuit diagram of another example embodiment of the present disclosure.

Corresponding reference numerals indicate corresponding parts throughout the several views of the drawings.

DETAILED DESCRIPTION

Figure 1:
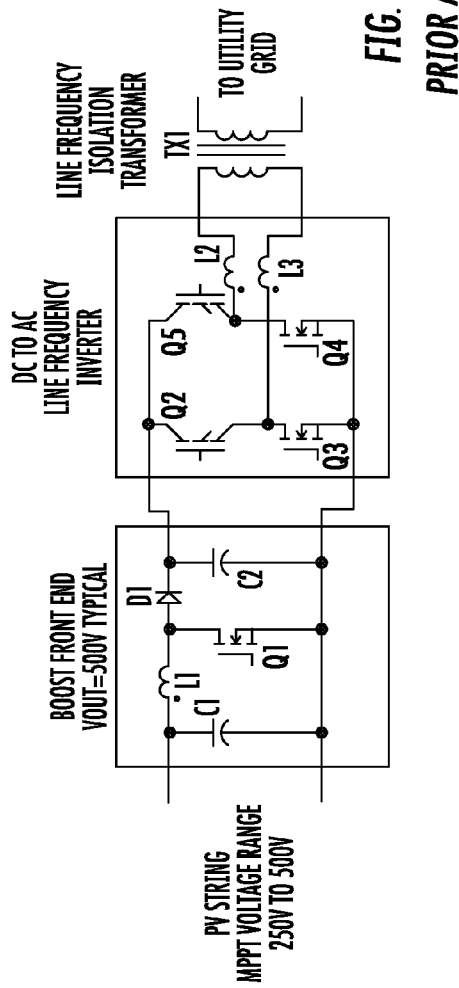
FIG. 1 is a known grid tied PV power system using a boost front end and a step down isolation stage.
Figure 2:
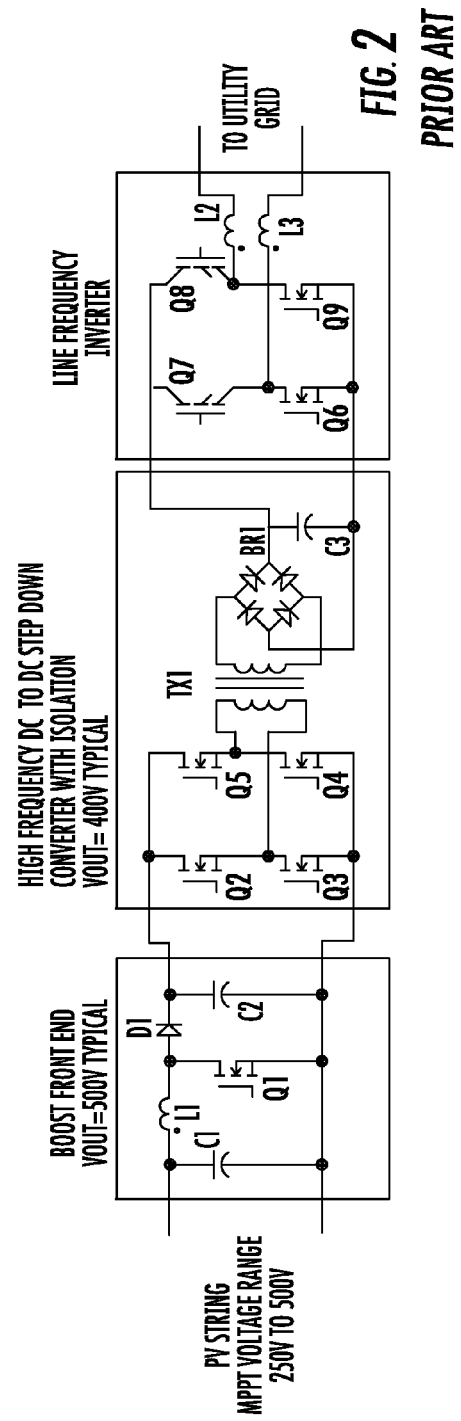
FIG. 2 is another known grid tied PV power system using a boost front end and a step down isolation stage.
Figure 3:
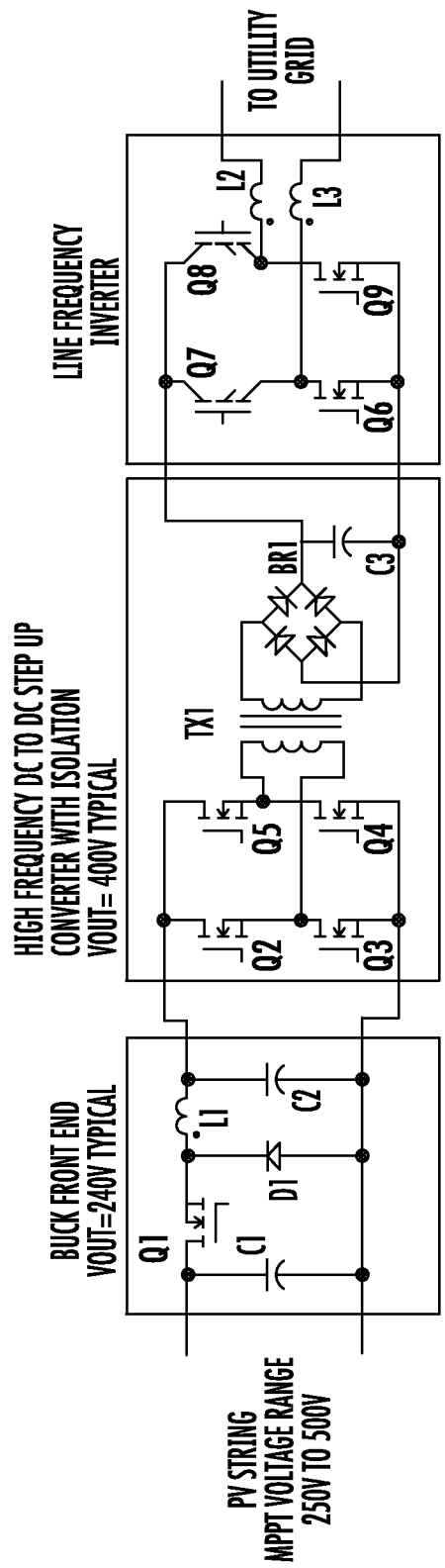
FIG. 3 is another known grid tied PV power system using a buck front end and a step up isolation stage.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 4:
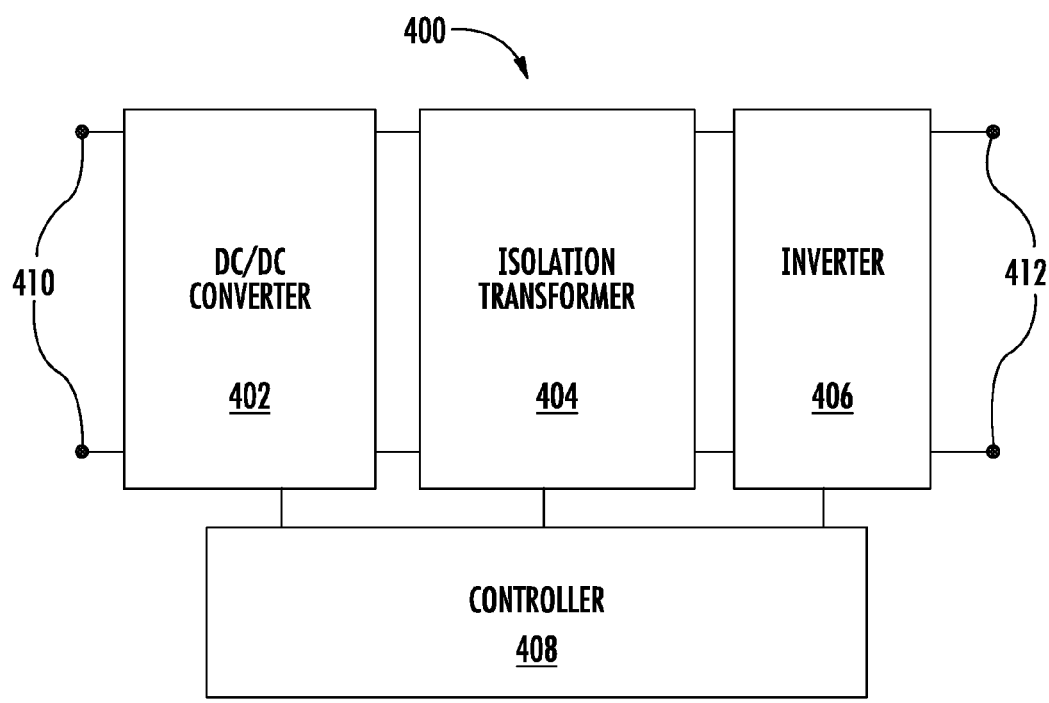
FIG. 4 is a block diagram of power system according to one example embodiment of the present disclosure.

A system according to one example embodiment of the present disclosure is illustrated in FIG. 4 and indicated generally by reference number 400. As shown in FIG. 4, the system 400 includes a DC/DC converter 402, an isolation transformer 404, a DC/AC inverter 406, and a controller 408. The system 400 has an input 410 for connection to an input power source. The system 400 also includes an output 412 for providing output power.

The converter 402 is a DC/DC converter operable to convert an input voltage to an output voltage. The converter 402 may be a buck-boost converter or any other converter operable to convert an input voltage to an output voltage that is greater or less than the input voltage.

The isolation transformer isolates at least the input 410 from the output 412. Although the isolation transformer 404 is shown as a separate component of the system 400, the isolation transformer may be incorporated within the converter 402 and/or the inverter 406. In some embodiments, the isolation transformer 404 has a turns ratio of approximately 1:1. In such embodiments, the isolation transformer outputs a DC voltage approximately equal to its DC input voltage.

The inverter 406 is a DC/AC inverter for generating an AC output voltage from a DC input voltage. The inverter 406 may include any suitable inverter topology. In embodiments discussed below, the inverter 406 is a buck derived inverter. Further, the inverter 406 may be a grid-tie inverter (i.e., configured for connecting its output to a utility power grid) or a non-grid-tie inverter (e.g., a residential inverter).

The controller 408 controls operation of the converter 402, the isolation transformer 404 and the inverter 406. The controller 408 may be an analog controller, a digital controller, and/or a combination of analog and digital controllers. The controller 408 may include separate controllers for one or more of the converter 402, the isolation transformer 404 and the inverter 406. In some embodiments, each of the converter 402, the isolation transformer 404 and the inverter 406 is controlled by a separate controller (which are sometimes referred to herein individually as controller 408 and collectively as controllers 408). The controller 408 may be incorporated within one or more of the converter 402, the isolation transformer 404 and the inverter 406.

The controller 408 is configured to operate the converter 402 as a buck converter when the voltage at the input of the converter 402 is greater than a reference voltage and to operate the converter 402 as a boost converter when the voltage at the input of the converter is less than the reference voltage. The controller 408 is also configured to operate the converter 402 according to a maximum power point tracking (MPPT) algorithm. The MPPT algorithm may be any suitable MPPT algorithm that endeavors to harvest maximum power from its input power source including, for example, perturb-and-observe ("P & O"), constant current regulation, constant voltage regulation, predictive maximum power point tracking using defined characteristics of the input power source, etc. The MPPT algorithm may be implemented in hardware or software.

The controller 408 may be configured (e.g., via software) to run its MPPT algorithm when the output voltage of the converter 402 is pulled below a threshold level (e.g., by the load). For example, the controller 408 may initially run an output voltage (or current) regulation mode. Subsequently, when the output voltage is pulled below the voltage regulation level (e.g., indicating the presence of a load), the controller 408 may switch from the voltage regulation mode to an MPPT mode.

In addition (or alternatively), the controller 408 may be configured to stop running its MPPT algorithm when, e.g., the output voltage of the converter 402 returns (i.e., rises) to the voltage regulation level. In that event, the controller 408 may revert to the voltage regulation mode. In this manner, if a load (e.g., the inverter 406) stops accepting maximum power from the converter 402, the converter 402 may stop supplying maximum power.

In addition (or alternatively), the controller 408 may be configured to stop running the MPPT algorithm when the output voltage (or current) of the converter 402 reaches a threshold level, such as a low voltage threshold. During the MPPT mode, the output current generally increases as the output voltage decreases. The controller 408 will preferably stop running the MPPT algorithm when the output voltage of the converter 402 falls below a defined voltage to prevent high current damage to the converter 402.

The controller 408 is configured to operate the inverter 406 to produce an AC output voltage from a DC input voltage. Preferably, the controller 408 is configured to control the inverter 406 to control the voltage provided to the inverter's input. For example, the controller 408 may control the amount of current the inverter 406 draws from the converter 402 to control the voltage at the inverter's input. Preferably, the controller 408 is configured to control the inverter 406 to control the voltage provided to the inverter's input as a function of the AC voltage at the output of the inverter 406.

Although the converter 402, the isolation transformer 404 and the inverter 406 are shown coupled together in a particular order in FIG. 4, it should be understood that the converter 402, the isolation transformer 404 and the inverter 406 may be arranged in a different order in other embodiments of this disclosure. Further, it should be understood that the converter 402 and the controller 408 configured for its operation may be used in other systems apart from the inverter 406 and/or the isolation transformer 404, and the inverter 406 and the controller 408 configured for its operation may be used in other systems apart from the converter 402 and/or the isolation transformer 404, without departing from the scope of this disclosure.

The system 400 of FIG. 4 can be used with photovoltaic (PV) input power sources, as shown in FIG. 5. More specifically, the input 410 may be coupled to photovoltaic (PV) source 502. The PV source 502 may be a single PV panel or a PV array including more than one PV panel. A PV array may include two or more PV panels coupled in series and/or in parallel. For example, a PV array may include two or more panels connected to each other in series to form a PV string, two or more PV panels coupled in parallel, two or more PV strings coupled in parallel, etc. The number of PV cells connected in series determines the open circuit output voltage of a PV string. The number of PV panels and/or PV strings connected in parallel determines the maximum electrical current producible by the PV array. The PV source 502 may include any suitable configuration of PV cells to produce a desired output voltage and current.

An example construction of the power system 400 is illustrated by power system 600 in FIGS. 6 and 7. In this example embodiment, the power system 600 is configured for providing an AC voltage to a 230V AC grid.

The DC/DC converter 402 in the power system 600 is a buck-boost converter. The buck-boost converter is operable as a boost converter to generate an output voltage greater than its input voltage or as a buck converter to generate an output voltage less than its input voltage. When the input voltage of the converter 402 is close to its output voltage, the converter may operate as a buck converter and a boost converter simultaneously in a buck-boost mode. The combination of the duty cycles of the control signals sent to the switches of the converter 402 are controlled to achieve regulation of the output voltage.

The PV source to which the power system 600 is to be coupled is designed to have an open circuit voltage of about 550V max to allow an adequate de-rating margin from the maximum permitted 600V. With a maximum open circuit voltage of about 550V, the maximum power point voltage (MPPV) for the PV source varies from as low as 250V DC to as high as 500VDC.

The DC/DC converter 402 converts the output of the PV source to a DC bus voltage. The isolation transformer 404 receives the DC bus voltage and outputs it to the inverter 406. The inverter generates an AC output voltage from the DC bus voltage received from the isolation transformer 404 and outputs it to an AC grid.

In this example, a DC bus of about 400V is desired. The PV source voltage is converted to a 400VDC bus by the DC/DC converter 402. If the PV string voltage is higher than 400V the buck portion of the DC/DC converter 402, including Q1, D1, and L1, operates as a buck converter and steps down the input voltage to about 400V across the output capacitor C2. In this condition, the boost switch Q2 is held off and the entire load current passes through D2. If the PV source voltage is lower than 400V, the DC/DC converter 402 operates in boost mode. The switch Q1 is kept on continuously and switch Q2 operates as a boost switch to step up the input voltage to 400VDC level. The buck free wheeling diode D1 is not involved and diode D2 operates as boost free wheeling diode.

With this configuration, when operating in either mode, the duty cycle of the active power converter is in its favorable range. For example, out of the common 350V to 450V MPPV range, the duty cycle for a buck converter is relatively high at 450V operation and the duty cycle of a boost converter is relatively low at 350V operation. Thus, in either condition, the converter 402 operates in a favorable operating condition to deliver relatively high efficiency.

The buck-boost converter is operated according to a maximum power point tracking (MPPT) algorithm. One example MPPT technique that may be used with the power system 600 is one which controls the PV source current or voltage being fed in to the DC/DC converter 402. Because the input energy to the DC/DC converter 402 is being controlled, it makes it a soft power source with its power limit dictated by the MPPT. The DC/DC converter 402 allows the output voltage to fall below its initial regulation level of 400V while increasing the current proportionately to keep the power constant. The inverter 406 loads the 400V DC bus up to a point where the DC bus drops out of voltage regulation to ensure operation at an operating point set by the MPPT circuit.

Because the DC/DC converter 402 outputs a DC bus of about 400V and the inverter needs an input voltage of about 400V, the isolation transformer 404 can operate at unitary gain. The isolation stage converts the 400V DC bus to an isolated 400V DC bus. This allows a 1:1 turns ratio in the transformer TX1 and results in a relatively simple magnetic construction. In other embodiments, the isolation transformer 404 may operate at a gain other than one.

The output of the isolation transformer 404 (which is sometimes still referred to herein as the DC bus voltage) is input to the inverter 406. In operation, the output of the inverter is tied to an AC grid (also sometimes referred to as a utility grid or utility line). The inverter 406 is based on a buck converter topology. Buck converters typically operate at higher efficiency when operated at higher duty cycles. The inverter 406 may be operated at a maximum duty cycle approaching 95%. Most of the time, the utility line is operating at 230V nominal RMS level with a peak voltage of 325V. Thus, the inverter 406 would need about 342V DC input to successfully generate a sinusoidal current of low distortion for the 230V grid connection. However, some margin must be considered for the low frequency ripple on the DC bus. Generally, such ripple is controlled to be lower than 30V peak to peak or +/−15V for the given mean value by choosing an appropriate bulk capacitance. With this consideration, a bus voltage of 360V can successfully drive the inverter 406 when grid voltage is 230V. The wider duty cycle operation also allows use of a smaller output inductor or, when used with a conventional inductor designed for 400V DC bus operation, a lower total harmonic current distortion level may be achieved.

As shown in FIG. 7, a line sense circuit, which may be part of the controller 408, detects the steady state grid voltage and its peak value. The inverter 406 forces the DC bus to a DC level which is lower than 400V but is sufficiently higher than the peak line voltage to operate the inverter 406 properly and fully under control. For example, an error amplifier, which may be part of the controller 408, may compare the DC bus voltage with a programmable reference voltage. When the programmable reference voltage is at, for example, 360V, the error amplifier output will cause the inverter to increase the inverter current until the DC bus voltage drops to 360V and then regulate the inverter current to keep the DC bus voltage at 360V in steady state condition.

When the AC grid voltage changes, the sense circuit detects the change and forces the inverter 406 to change the DC bus voltage accordingly. For example, if the AC line voltage is 230V RMS and the DC bus is 360VDC and the AC line voltage changes to 250V, the sense circuit detects the change and the inverter 406 is operated to cause the DC bus voltage to increase to about 370V. If the line voltage changes suddenly, there may be some delay in adjustment of the DC bus voltage. During this time, some distortion in current may be experienced for a short time, which is restored once the DC bus voltage is changed to the appropriate level. The reference to the error amplifier is varied according to the variations in AC grid voltage, keeping it slightly higher than the peak grid voltage to allow full control while maximizing the efficiency. Minor and/or fast variations in the AC grid voltage are ignored. The magnitude of variations that may be ignored may depend on the maximum duty cycle that the particular inverter is capable of achieving and/or the allowable low frequency ripple on the DC bus voltage for a particular application.

FIG. 8 illustrates another example embodiment of a power system 800 in which the isolation transformer 404 is coupled to the PV input source and its output provides the input to DC/DC converter 402. The power system 800 operates in generally the same manner as the other power systems (e.g., 400, 600) disclosed herein.

Although described herein for use in photovoltaic systems, the power systems of the present disclosure may be used with other power sources including, for example windmills.

Each component described herein (e.g., converter 402, isolation transformer 404, inverter 406, etc.) may be used alone or with one or more other components (including components not shown or described herein). Further, the aspects of this disclosure may be used individually or in various combinations with other aspects of this disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power conversion system for use with a photovoltaic (PV) power source, the system comprising:
   a DC/DC converter for converting a first DC voltage into a second DC voltage;
   an isolation transformer having a turns ratio of approximately 1:1;
   an inverter including an input for receiving a DC voltage and an output for providing an AC voltage; and
   at least one controller for controlling the DC/DC converter and the inverter, the controller configured to operate the DC/DC converter as a buck converter or a boost converter based, at least in part, on whether the first DC voltage is greater or less than a reference voltage, and to operate the inverter to control the DC voltage at the inverter's input as a function of the AC voltage at the inverter's output to maintain the DC voltage at the inverter's input within a defined range above a peak magnitude of the AC voltage at the inverter's output.

2. The system of claim 1 wherein the controller is configured to operate the DC/DC converter according to a maximum power point tracking (MPPT) algorithm.

3. The system of claim 2 wherein the inverter is a grid-tie inverter.

4. The system of claim 3 wherein the DC/DC converter includes an output coupled to the inverter's input via the isolation transformer.

5. The system of claim 3 wherein the inverter's output is coupled to an AC utility grid.

6. The system of claim 5 wherein the DC/DC converter includes an input coupled to a PV power source.

7. The system of claim 3 wherein the second DC voltage is the reference voltage at least when the controller is operating the DC/DC converter according to the MPPT algorithm.

8. A power system comprising:
an input for receiving an input voltage from a variable DC input source;
an output for providing an output voltage;
a buck-boost converter operable to convert a first DC voltage to a second DC voltage;
an inverter including an input for receiving the second DC voltage and an output for providing an AC voltage; and
at least one controller configured to operate the buck-boost converter as a buck converter or a boost converter based, at least in part, on whether the input voltage is greater or less than a reference voltage, to operate the buck-boost converter according to a maximum power point tracking algorithm (MPPT), and to operate the inverter to control the second DC voltage at the inverter's input as a function of the AC voltage at the inverter's output to maintain the second DC voltage at the inverter's input within a defined range above a peak magnitude of the AC voltage at the inverter's output.

9. The system of claim 8 further comprising an isolation transformer.

10. The system of claim 9 wherein the isolation transformer has a turns ratio of approximately 1:1.

11. The system of claim 10 wherein the second DC voltage is the reference voltage at least when the controller is operating the buck-boost converter according to the MPPT algorithm.

12. A power system comprising:
an input for receiving an input voltage from a variable DC input source;
an output for providing an output voltage;
an inverter including an input for receiving a DC voltage and an output for providing an AC voltage; and
at least one controller configured to operate the inverter to control the DC voltage at the inverter's input as a function of the AC voltage at the inverter's output to maintain the DC voltage at the inverter's input within a defined range above a peak magnitude of the AC voltage at the inverter's output.

13. The system of claim 12 wherein the inverter is a grid-tie inverter.

14. The system of claim 13 further comprising a DC/DC converter including an input for receiving a first DC voltage and an output for outputting a second DC voltage.

15. The system of claim 12 further comprising an isolation transformer.

16. The system of claim 15 wherein the isolation transformer has a turns ratio of approximately 1:1.

17. The system of claim 16 further comprising a DC/DC converter including an input for receiving a first DC voltage and an output for outputting a second DC voltage and wherein the output of the DC/DC converter is coupled to the inverter's input via the isolation transformer.

18. The system of claim 17 wherein the controller is configured to operate the DC/DC converter as a buck converter or a boost converter based, at least in part, on whether the input voltage is greater or less than a reference voltage.

19. The system of claim 10 wherein the buck-boost converter includes an output coupled to the inverter's input via the isolation transformer.

20. The system of claim 18 wherein the controller is configured to operate the DC/DC converter according to a maximum power point tracking (MPPT) algorithm.

21. The system of claim 20 wherein the second DC voltage is the reference voltage at least when the controller is operating the DC/DC converter according to the MPPT algorithm.

22. The system of claim 19 wherein the inverter is a grid-tie inverter.

23. The system of claim 22 wherein the inverter's output is coupled to an AC utility grid and wherein the buck-boost converter includes an input coupled to a PV power source.

* * * * *